W. G. HURST.
PLANTER PLATE ADJUSTER.
APPLICATION FILED JULY 13, 1917.
1,263,771.
Patented Apr. 23, 1918.
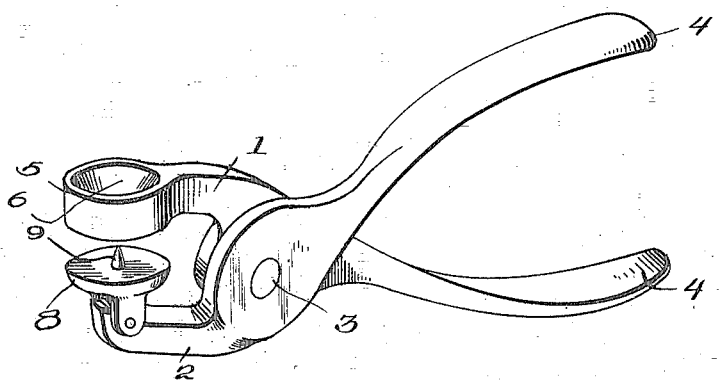
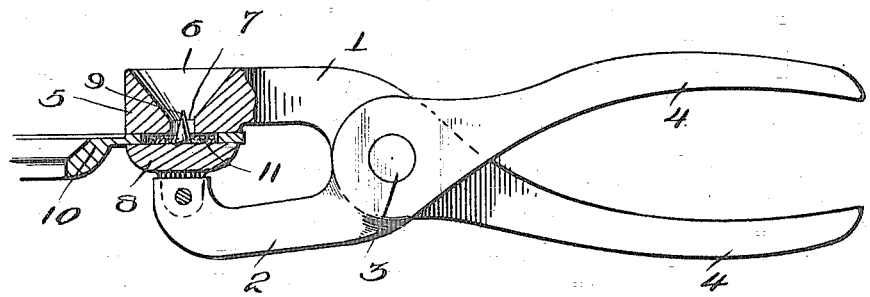
Inventor
Woodford G Hurst
By
Attorneys.

UNITED STATES PATENT OFFICE.

WOODFORD G. HURST, OF OXFORD, KANSAS, ASSIGNOR OF ONE-HALF TO SAMUEL R. PAYNE, OF OXFORD, KANSAS.

PLANTER-PLATE ADJUSTER.

1,263,771.                Specification of Letters Patent.    Patented Apr. 23, 1918.

Application filed July 13, 1917.   Serial No. 180,402.

*To all whom it may concern:*

Be it known that I, WOODFORD G. HURST, a citizen of the United States, residing at Oxford, in the county of Sumner and State of Kansas, have invented certain new and useful Improvements in Planter-Plate Adjusters, of which the following is a specification.

The object of this invention is to provide a simple, inexpensive and efficient tool by the use of which the holes in the seed distributing plates or disks of planters may be readily filled. The disks by which the flow of seed from the hopper to the seed spout of planters is controlled are subjected to considerable wear and in the course of a season the holes or openings are considerably enlarged so that they tend to permit the passage of an excessive quantity of the seed. To prevent this flow and consequent waste of seed it is the general practice to fill these holes with lead or some similar material which will melt at a low temperature and then file away the central portion of the filling so that the opening provided will be of the proper size. This operation at present requires the services of a skilled workman and involves considerable delay and expense to the farmer. My invention provides a simple tool by which the farmer may fill the holes himself without loss of time and at a minimum expense.

The invention is illustrated in the accompanying drawings and will be hereinafter described, the novel features being subsequently pointed out in the claims following the detailed description.

In the drawings:

Figure 1 is a perspective view of my improved tool, and

Fig. 2 is a sectional elevation of the same showing the manner of using it.

My improved tool comprises a pair of jaw members 1 and 2 which are pivoted together, as shown at 3, in the manner of tongs or pliers and are constructed with extensions or handle members 4 projecting beyond the pivot. The upper jaw 1 is constructed with a circular enlargement 5 at its free end, and this enlargement contains a cavity 6 the walls of which converge downwardly, as shown most clearly in Fig. 2, to a central escape opening 7. To the extremity of the jaw 2 I pivot a core carrier or platen 8 upon the upper side of which at the center thereof is a core or spur 9 which is preferably tapered so that it will readily enter the escape opening 7 and is of less diameter than said opening so that molten metal placed in the cavity 6 may readily flow around the core or spur so as to spread within the space between the upper jaw member and the platen.

In using the tool, the seed plate or disk 10 has its edge portion inserted between the jaws and the seed opening is properly centered around the spur or core 9. The jaws are then closed against the opposite faces of the seed disk as clearly shown in Fig. 2, and molten lead or similar material is poured into the cavity 6 and will flow through the escape opening 7 around the core 9 and spread within the space defined by the walls of the seed opening in the disk 10 and the opposed faces of the upper jaw and the platen or core carrier, this molten material being indicated at 11. The diameter of the member 5 and the platen 8 should be greater than the maximum diameter ordinarily obtained by the seed opening so that the opposed faces of the members of the tool will extend beyond the walls of the seed opening. The lead or other filling will flatten out in the seed opening and will quickly cool and solidify so that when the jaws are separated and the tool withdrawn from the seed disk the upper and lower surfaces of the filling will be flush with the upper and lower surfaces of the disk. A central opening will, of course, be left in the filling by the core 9 and this opening may be easily filed to the desired diameter.

My improved tool is exceedingly simple in its construction so that it may be produced at a very low cost and may be readily manipulated by anyone without requiring the use of highly skilled labor. By pivoting the core carrier or platen to the under jaw of the tool the said core carrier or platen is enabled to fit squarely to the under surface of the seed disk so that the opposed faces of the platen and the upper jaw may lie parallel. The escape opening 7 may be of such diameter that the molten metal will readily escape and enter the seed opening in the seed disk and that a seed outlet of the desired diameter may be very rapidly formed. The cavity 6 may be of such capacity that it will hold just enough metal to fill the seed opening so that there will be no waste of the filling material.

Having thus described the invention, what is claimed as new is:

1. A molding tool comprising a pair of pivoted jaws, one of the jaws being constructed with a cavity, a platen pivotally mounted upon the other jaw, and a core carried by said platen and adapted to enter the cavity.

2. A molding tool comprising a pair of jaws adapted to fit against opposite faces of a seed disk, one of said jaws being constructed with a cavity having a central outlet at its bottom, a core carrier pivoted upon the other jaw, and a core rising centrally from said core carrier to enter the said outlet.

3. A molding tool comprising a pair of jaws adapted to engage against opposite sides of a plate having an opening therein, one of said jaws having a cavity to lead into said opening, and the other of said jaws being equipped with a core to pass through said opening and enter the cavity.

In testimony whereof I affix my signature.

WOODFORD G. HURST. [L. S.]

Copies of this patent may be obtained for five cents each, by addressing the "Commissioner of Patents, Washington, D. C."